(12) United States Patent
Yoshida et al.

(10) Patent No.: US 11,506,261 B2
(45) Date of Patent: Nov. 22, 2022

(54) GEAR DEVICE

(71) Applicant: NABTESCO CORPORATION, Tokyo (JP)

(72) Inventors: Shunsuke Yoshida, Mie (JP); Kazuya Furuta, Mie (JP); Tomohiko Masuda, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/578,596

(22) Filed: Sep. 23, 2019

(65) Prior Publication Data

US 2020/0018380 A1  Jan. 16, 2020

Related U.S. Application Data

(63) Continuation of application No. 15/655,324, filed on Jul. 20, 2017, now Pat. No. 10,495,183.

(30) Foreign Application Priority Data

Jul. 28, 2016 (JP) .................................. 2016-148696

(51) Int. Cl.
*F16H 1/32* (2006.01)
*F16H 57/02* (2012.01)
(Continued)

(52) U.S. Cl.
CPC ............... *F16H 1/32* (2013.01); *F16C 3/06* (2013.01); *F16C 17/02* (2013.01); *F16C 19/548* (2013.01);
(Continued)

(58) Field of Classification Search
CPC ...... F16H 1/32; F16H 1/321; F16H 2001/323; F16H 2001/324; F16H 2001/327;
(Continued)

(56) References Cited

U.S. PATENT DOCUMENTS

| 8,156,840 B2 | 4/2012 | Tange | |
|---|---|---|---|
| 2009/0118050 A1* | 5/2009 | Takeuchi | F16H 1/32 |
| | | | 475/168 |
| 2016/0090966 A1 | 3/2016 | Kullin et al. | |

FOREIGN PATENT DOCUMENTS

| CN | 101725642 A | 6/2010 |
|---|---|---|
| DE | 112013005765 | 9/2015 |

(Continued)

OTHER PUBLICATIONS

Non-final Office Action U.S. Appl. No. 15/655,324 dated Apr. 18, 2019.

(Continued)

*Primary Examiner* — Erin D Bishop
(74) *Attorney, Agent, or Firm* — Pillsbury Winthrop Shaw Pittman LLP

(57) ABSTRACT

A gear device includes an outer cylinder; an internal member at least partially housed in the outer cylinder and configured to rotate relative to the outer cylinder about a predetermined rotation axis; a first main bearing fitted into an annular space formed between the outer cylinder and the internal member; and a second main bearing fitted into the annular space and configured to define the rotation axis in cooperation with the first main bearing. A distance between a first intersection where a load action line of the first main bearing intersects with the rotation axis and a second intersection where a load action line of the second main bearing intersects with the rotation axis is set to fall within a range expressed by a predetermined inequality expression.

6 Claims, 2 Drawing Sheets

(51) Int. Cl.
*F16H 57/021* (2012.01)
*F16C 19/54* (2006.01)
*F16C 3/06* (2006.01)
*F16C 17/02* (2006.01)

(52) U.S. Cl.
CPC ..... *F16H 57/021* (2013.01); *F16H 57/02004* (2013.01); *F16C 2361/61* (2013.01); *F16C 2361/65* (2013.01); *F16H 2001/323* (2013.01); *F16H 2001/324* (2013.01); *F16H 2001/325* (2013.01); *F16H 2001/327* (2013.01)

(58) Field of Classification Search
CPC ............. F16H 57/021; F16H 57/02004; F16H 57/022; F16H 2057/0221; F16H 2057/0222; F16H 2057/0225; F16C 2361/61; F16C 2361/65; F16C 19/54–56
See application file for complete search history.

(56) References Cited

FOREIGN PATENT DOCUMENTS

| DE | 102015116904 | 6/2016 |
|---|---|---|
| EP | 2180210 A1 | 4/2010 |
| EP | 2740948 | 6/2014 |
| JP | 2014-139483 A | 7/2014 |
| JP | 2015-137705 A | 7/2015 |
| JP | 2016-098907 A | 5/2016 |
| JP | 2016-109264 A | 6/2016 |
| KR | 10-2010-0081921 A | 7/2010 |
| KR | 10-2016-0078907 A | 7/2016 |

OTHER PUBLICATIONS

Notice of Allowance U.S. Appl. No. 15/655,324 dated Sep. 18, 2019.
Office Action dated May 7, 2020 issued in corresponding Japanese Patent Application No. 2016-148696 with English translation.
Decision of Refusal dated Jul. 7, 2020 issued in corresponding Japanese Patent Application No. 2016-148696 with English translation (6 pgs.).
Notice of Reasons for Refusal dated Aug. 3, 2021, issued in corresponding Japanese Patent Application No. 2020-169777 with English translation (6 pgs.).
First Office Action dated Aug. 12, 2021, issued in corresponding Chinese Patent Application No. 201710601463.7 with English translation (17 pgs.).
Notification of Reasons for Refusal dated May 13, 2021, issued in corresponding Korean Patent Application No. 10-2017-0090841 with English translation (10 pgs.).

* cited by examiner

GEAR DEVICE

CROSS-REFERENCE TO RELATED APPLICATIONS

This application is a Continuation of U.S. Ser. No. 15/655,324, filed Jul. 20, 2017, which is based on and claims the benefit of priority from Japanese Patent Application Serial No. 2016-148696 (filed on Jul. 28, 2016), the contents of each of which are hereby incorporated by reference in their entirety.

TECHNICAL FIELD

The present invention relates to a gear device having a robust structure.

BACKGROUND

A gear device has been used in various technical fields such as industrial robots and machine tools (see Japanese Patent Application Publication No. 2016-109264 (the '264 Publication)). Such a gear device is provided with an outer cylinder, a carrier, and a main bearing. The outer cylinder encircles the carrier. The main bearing is disposed in an annular space formed between the outer cylinder and the carrier and defines a rotation axis. The carrier rotates relative to the outer cylinder about the rotation axis.

The main bearing described in the above '264 Publication defines an acting direction of a load applied to the gear device. The main bearing described in the above '264 Publication defines a load action line inclined with respect to the above-mentioned rotation axis.

SUMMARY

The inventors of the present invention have found that a relationship between the load action line and a component of the gear device has a significant influence on a life of the gear device. The present invention has as its object to provide a long-life gear device.

A gear device according to one aspect of the present invention is provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. A distance between a first intersection where a load action line of the first main bearing intersects with the rotation axis and a second intersection where a load action line of the second main bearing intersects with the rotation axis is set to fall within a range expressed by an inequality expression below.

$$(BBD+BRD\times 2)\times 0.95 < IID < (BBD+BRD\times 2)\times 1.05 \quad \text{(Expression 1)}$$

IID: Distance Between First Intersection and Second Intersection
BBD: Distance Between First Main Bearing and Second Main Bearing
BRD: Distance Between First Main Bearing and Rotation Axis A gear device according to another aspect of the present invention is provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. The outer cylinder includes a tubular case and an annular flange portion protruding outward from the case. Each of a load action line of the first main bearing and a load action line of the second main bearing passes through the case and the flange portion in a consecutive manner.

A gear device according to still another aspect of the present invention is provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. An intersection where a load action line of the first main bearing intersects with a load action line of the second main bearing is separated by a predetermined distance from a straight line that is parallel to the rotation axis, and connecting a center of a rolling element of the first main bearing to a center of a rolling element of the second main bearing. The predetermined distance is set to fall within a range expressed by an inequality expression below.

$$\frac{BBD}{2}\times 0.95 < BID < \frac{BBD}{2}\times 1.05 \quad \text{(Expression 4)}$$

BID: Predetemined Distance
BBD: Distance Between First Main Bearing and Second Main Bearing A gear device according to yet still another aspect of the present invention is provided with an outer cylinder including an inner peripheral surface having a plurality of internal teeth formed thereon, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. The internal member includes a gear having a plurality of external teeth meshed with the plurality of internal teeth, a crank shaft assembly configured to cause the gear to perform oscillatory rotation so that a center of the gear revolves about the rotation axis, and a carrier retaining the crank shaft assembly and configured to rotate relative to the outer cylinder about the rotation axis. The crank shaft assembly includes a first journal retained by the carrier, a second journal retained by the carrier on an opposite side to the first journal, a first journal bearing configured to receive the first journal inserted thereinto, and a second journal bearing configured to receive the second journal inserted thereinto. Respective load action lines of the first main bearing and the second main bearing pass through, in an extending direction of the rotation axis, an outer side of a rolling element of the first journal bearing and an outer side of a rolling element of the second journal bearing, respectively.

The above-mentioned gear device is capable of having a long life.

DESCRIPTION OF THE PREFERRED EMBODIMENTS

<First Embodiment> The inventors of the present invention have found that a position of an intersection where a load action line of a main bearing fitted into an annular space between an outer cylinder and an internal member intersects with a rotation axis of the outer cylinder or the internal member has an influence on a life of a gear device. The first embodiment describes an appropriate position of the intersection.

Figure 1:
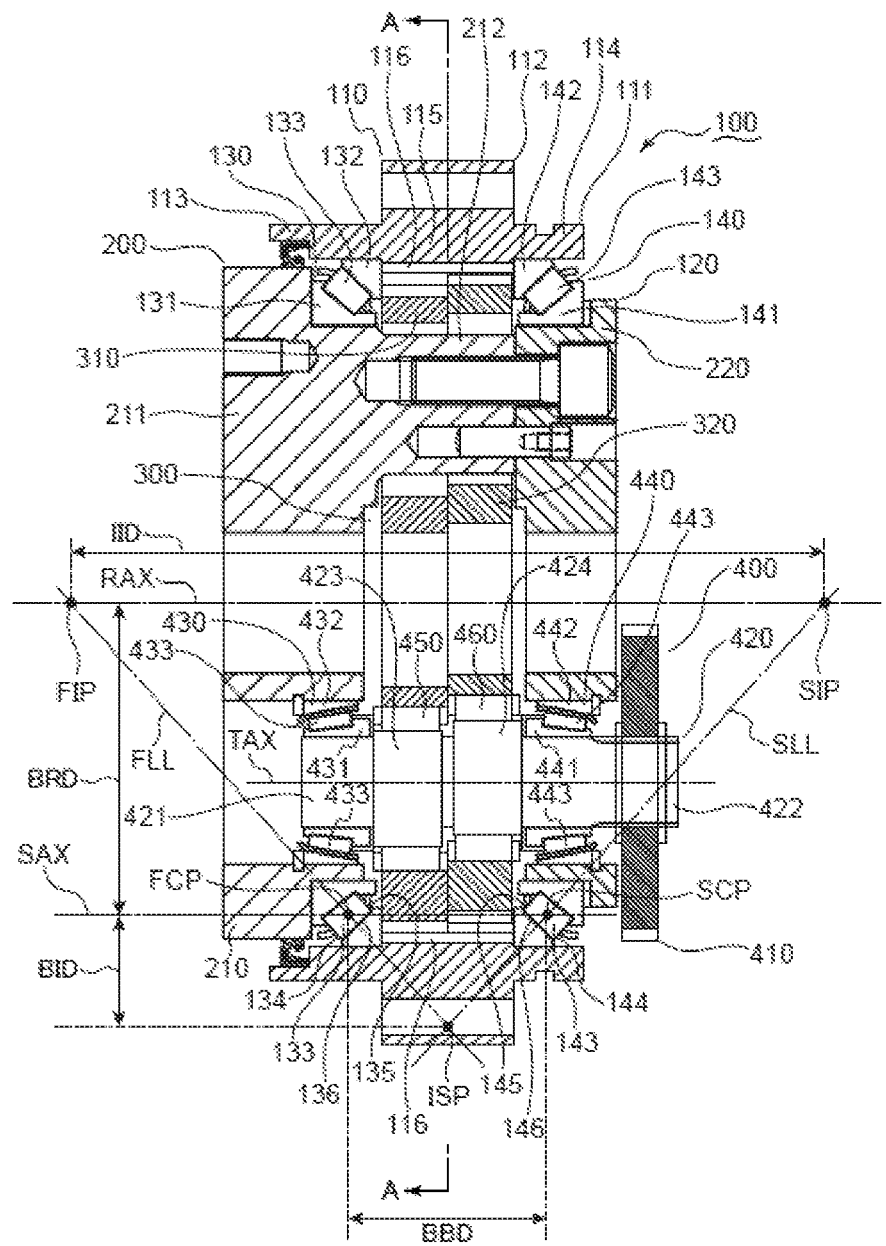
FIG. 1 is a schematic sectional view of an illustrative gear device.

FIG. 1 is a schematic sectional view of an illustrative gear device 100. With reference to FIG. 1, a description is given of the gear device 100.

The gear device 100 may be provided with an outer cylinder 110, an internal member 120, a first main bearing 130, and a second main bearing 140. The outer cylinder 110 as a whole may have a cylindrical shape. The internal member 120 may be partially housed in the outer cylinder 110. Alternatively, it may also be possible that the internal member as a whole is housed in the outer cylinder 110.

The first main bearing 130 may be fitted into an annular space formed between the outer cylinder 110 and the internal member 120. Similarly to the first main bearing 130, the second main bearing 140 may be fitted into an annular space formed between the outer cylinder 110 and the internal member 120.

FIG. 1 shows a rotation axis RAX. The rotation axis RAX may correspond to a center axis of each of the outer cylinder 110, the first main bearing 130, and the second main bearing 140. When the internal member 120 is fixed, the outer cylinder 110 may rotate about the rotation axis RAX. When the outer cylinder 110 is fixed, the internal member 120 may rotate about the rotation axis RAX. The second main bearing 140 may be separated by a predetermined distance from the first main bearing 130 in an extending direction of the rotation axis RAX.

The first main bearing 130 may include an inner race 131, an outer race 132, and a plurality of rolling elements 133 (FIG. 1 shows two rolling elements 133). The inner race 131 may include an inner peripheral surface configured to come in contact with the internal member 120. The outer race 132 may include an outer peripheral surface configured to come in contact with the outer cylinder 110. The plurality of rolling elements 133 may be disposed circularly between the inner race 131 and the outer race 132. Each of the plurality of rolling elements 133 may be configured to move by rolling between the inner race 131 and the outer race 132.

The second main bearing 140 may include an inner race 141, an outer race 142, and a plurality of rolling elements 143 (FIG. 1 shows two rolling elements 143). The inner race 141 may include an inner peripheral surface configured to come in contact with the internal member 120. The outer race 142 may include an outer peripheral surface configured to come in contact with the outer cylinder 110. The plurality of rolling elements 143 may be disposed circularly between the inner race 141 and the outer race 142. Each of the plurality of rolling elements 143 may be configured to move by rolling between the inner race 141 and the outer race 142.

Each of the plurality of rolling elements 133 may have a shape of a substantially circular truncated cone. Each of the plurality of rolling elements 133 may include a first end surface 134, a second end surface 135, and an outer peripheral surface 136. The first end surface 134 may be wider than the second end surface 135. The second end surface 135 may be substantially coaxial with the first end surface 134. The second end surface 135 may be closer to the rotation axis RAX than the first end surface 134 is. The outer peripheral surface 136 may come in contact with the inner race 131 and the outer race 132.

Each of the plurality of rolling elements 143 may have a shape of a substantially circular truncated cone. Each of the plurality of rolling elements 143 may include a first end surface 144, a second end surface 145, and an outer peripheral surface 146. The first end surface 144 may be wider than the second end surface 145. The second end surface 145 may be substantially coaxial with the first end surface 144. The second end surface 145 may be closer to the rotation axis RAX than the first end surface 144 is. The outer peripheral surface 146 may come in contact with the inner race 141 and the outer race 142.

FIG. 1 shows a center point FCP of each of the plurality of rolling elements 133. The center point FCP may be positioned on a midpoint of a line segment substantially orthogonal to the first end surface 134 and the second end surface 135 of the each of the plurality of rolling elements 133 and on a rolling axis of the each of the plurality of rolling elements 133.

FIG. 1 shows a center point SCP of each of the plurality of rolling elements 143. The center point SCP may be positioned on a midpoint of a line segment substantially orthogonal to the first end surface 144 and the second end surface 145 of the each of the plurality of rolling elements 143 and on a rolling axis of the each of the plurality of rolling elements 143.

FIG. 1 shows a load action line FLL extending in a right-angled direction with respect to the rolling axis of each of the plurality of rolling elements 133. The load action line FLL may pass through the center point FCP and intersect with the rotation axis RAX at a first intersection FIP.

FIG. 1 shows a load action line SLL extending in a right-angled direction with respect to the rolling axis of each of the plurality of rolling elements 143. The load action line SLL may pass through the center point SCP and intersect with the rotation axis RAX at a second intersection SIP.

FIG. 1 shows a straight line SAX parallel to the rotation axis RAX. The straight line SAX may pass through the center points FCP and SCP. With regard to this embodiment, it may also be possible that a distance between the first main bearing 130 and the second main bearing 140 is defined as a distance between the center points FCP and SCP on the straight line SAX. It may also be possible that a distance between the first main bearing 130 and the rotation axis RAX is defined as a distance between the rotation axis RAX and the straight line SAX.

As shown in FIG. 1, the second intersection SIP may be sufficiently separated from the first intersection FIP, and thus the gear device 100 can be provided with sufficient robustness with respect to an external force acting to bend the rotation axis RAX. In addition, a distance between the first intersection FIP and the second intersection SIP may not be excessively long, and thus the first main bearing 130 and the second main bearing 140 can appropriately accept a force acting in an axial direction (an extending direction of the rotation axis RAX) and a force acting in a radial direction (a direction orthogonal to the rotation axis RAX). A distance IID between the first intersection FIP and the second intersection SIP may be set to fall within a range expressed by an inequality expression below.

$$(BBD+BRD\times2)\times0.95<IID<(BBD+BRD\times2)\times1.05 \quad \text{(Expression 7)}$$

IID: Distance Between First Intersection FIP and Second Intersection SIP

BBD: Distance Between First Main Bearing 130 and Second Main Bearing 140

BRD: Distance Between First Main Bearing 130 and Rotation Axis RAX

<Second Embodiment> From the viewpoint of weight reduction, preferably, the outer cylinder may be formed to be as thin as possible. A thin outer cylinder, however, may tend to be deformed. A second embodiment describes an appropriate relationship between the load action line and a shape of the outer cylinder.

As shown in FIG. 1, the outer cylinder 110 may include a substantially cylindrical case 111 and an annular flange portion 112 protruding outward from the case 111. The case 111 may include a first tube portion 113, a second tube portion 114, and a third tube portion 115. The first main bearing 130 may be fitted into an annular space formed between the first tube portion 113 and the internal member 120. The second main bearing 140 may be fitted into an annular space formed between the second tube portion 114 and the internal member 120. The third tube portion 115 may be positioned between the first tube portion 113 and the second tube portion 114. The flange portion 112 may be formed integrally with the third tube portion 115. In the extending direction of the rotation axis RAX, the flange portion 112 and the third tube portion 115 may be positioned between the first main bearing 130 and the second main bearing 140.

The load action line FLL of the first main bearing 130 may pass through the case 111 and the flange portion 112 in a consecutive manner. That is, the load action line FLL may not cross a stepped space between the first tube portion 113 and the flange portion 112. Thus, it may be unlikely that the first tube portion 113 is deformed outward.

The load action line SLL of the second main bearing 140 may pass through the case 111 and the flange portion 112 in a consecutive manner. That is, the load action line SLL may not cross a stepped space between the second tube portion 114 and the flange portion 112. Thus, it may be unlikely that the second tube portion 114 is deformed outward.

FIG. 1 shows an intersection ISP between the load action lines FLL and SLL. The intersection ISP may be positioned in the flange portion 112. An outward force acting in an extending direction of the load action line FLL and an outward force acting in an extending direction of the load action line SLL appear as a large outward resultant force at the intersection ISP. The outer cylinder 110, however, is thick specifically at a forming position of the flange portion 112 and thus is hardly deformed against a large outward resultant force.

A designer who designs the gear device 100 can design the outer cylinder 110 so that the intersection ISP is positioned in the flange portion 112. In this case, when the intersection ISP is excessively separated from the straight line SAX, the outer cylinder 110 may excessively increase in weight. On the other hand, when the intersection ISP is too close to the straight line SAX, in some cases, the outer cylinder 110 may become brittle. Thus, preferably, a distance BID between the intersection ISP and the straight line SAX may be set to fall within a range expressed by an inequality expression below.

$$\frac{BBD}{2}\times0.95<BID<\frac{BBD}{2}\times1.05 \quad \text{(Expression 8)}$$

BID: Distance Between Intersection ISP and Straight Line SAX

BBD: Distance Between First Main Bearing 130 and Second Main Bearing 140

When the above inequality expression is satisfied, the distance BID has a sufficiently large value. A larger value of the distance BID means a larger value of a contact angle, and thus each of the first main bearing 130 and the second main bearing 140 can deliver high performance as a thrust bearing. Thus, the gear device 100 can accept a large force (namely, an axial load or a thrust load) acting in the axial direction (namely, a thrust direction).

<Third Embodiment> The internal member may be formed of various components. Preferably, the load action line does not pass through a brittle part of the internal member. A third embodiment describes an appropriate relationship between the load action line and a structure of the internal member.

Figure 2:
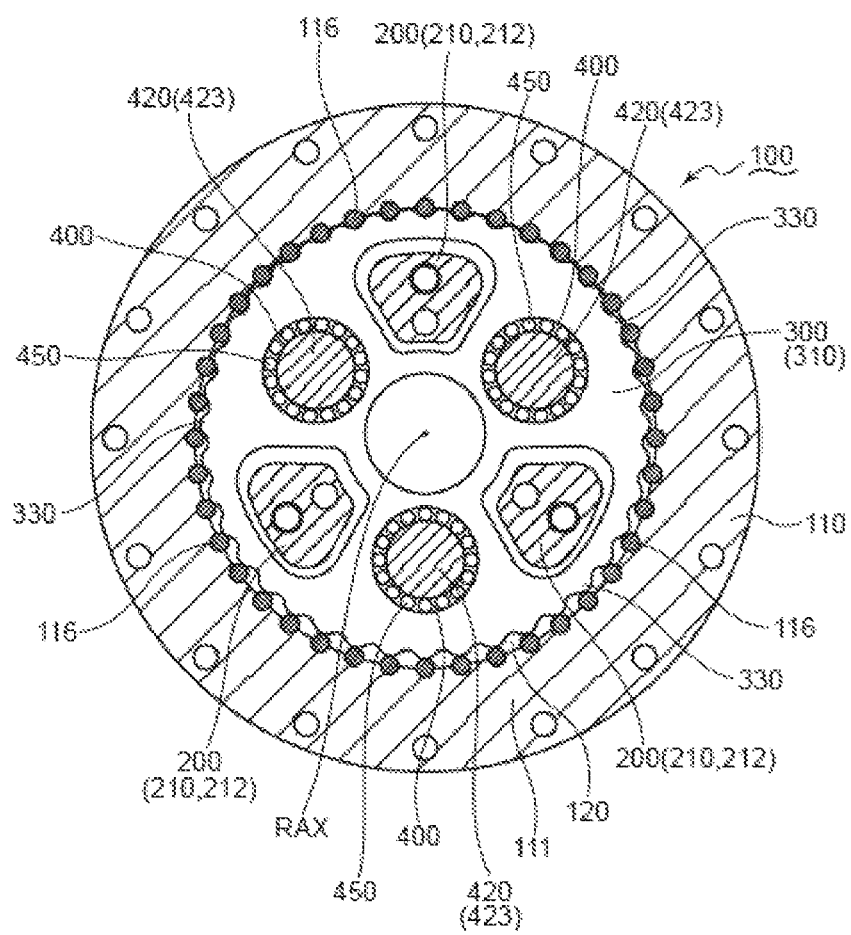
FIG. 2 is a schematic sectional view of the gear device along a line A-A shown in FIG. 1.

FIG. 2 is a schematic sectional view of the gear device 100 along a line A-A shown in FIG. 1. With reference to FIG. 1 and FIG. 2, a description is given of the gear device 100.

As shown in FIG. 1, the internal member 120 may include a carrier 200, a gear portion 300, and three crank shaft assemblies 400 (FIG. 1 shows one of the three crank shaft assemblies 400). As shown in FIG. 2, the outer cylinder 110 may include a plurality of internal tooth pins 116. The case 111 may form a substantially cylindrical internal space in which the carrier 2, the gear portion 300, and the crank shaft assemblies 400 are housed. The plurality of internal tooth pins 116 may be arranged circularly along an inner peripheral surface of the case 111 (the third tube portion 115) to form an internally toothed ring.

Each of the internal tooth pins 116 may be made of a cylindrical columnar member extending in the extending direction of the rotation axis RAX. Each of the internal tooth pins 116 may be fitted into a groove formed in an inner wall of the case 111. Thus, each of the internal tooth pins 116 may be appropriately retained by the case 111.

The plurality of internal tooth pins 116 may be arranged at substantially regular intervals around the rotation axis RAX. Each of the internal tooth pins 116 may have a semicircular peripheral surface projecting from the inner wall of the case 111 toward the rotation axis RAX. Thus, the plurality of internal tooth pins 116 may serve as a plurality of internal teeth meshed with the gear portion 300.

As shown in FIG. 1, the carrier 200 may include a base portion 210 and an end plate 220. The carrier 200 as a whole may have a cylindrical shape. The base portion 210 may be fitted into a circular space surrounded by the inner race 131 of the first main bearing 130. The end plate 220 may be fitted into a circular space surrounded by the inner race 141 of the second main bearing 140.

The carrier 200 may be rotatable relative to the outer cylinder 110 about the rotation axis RAX. When the carrier 200 is fixed, the outer cylinder 110 may rotate about the rotation axis RAX. When the outer cylinder 110 is fixed, the carrier 200 may rotate about the rotation axis RAX.

The base portion 210 may include a base plate portion 211 (see FIG. 1) and three shaft portions 212 (see FIG. 2). Each of the three shaft portions 212 may extend from the base plate portion 211 toward the end plate 220. The end plate 220 may be connected to a distal surface of each of the three shaft portions 212. It may also be possible that the end plate 220 is connected to the distal surface of each of the three shaft portions 212 by using a reamer bolt, a locating pin, or other appropriate fixing techniques. A principle of this embodiment will not be limited to a particular connection technique used between the end plate 220 and each of the three shaft portions 212.

As shown in FIG. 1, the gear portion 300 may be disposed between the first main bearing 130 fitted to the base plate portion 211 and the second main bearing 140 fitted to the end plate 220. The three shaft portions 212 may extend through the gear portion 300 and be connected to the end plate 220.

The gear portion 300 may include two gears 310 and 320. The gear 310 may be disposed between the base plate portion 211 and the gear 320. The gear 320 may be disposed between the end plate 220 and the gear 310. As shown in FIG. 2, each of the gears 310 and 320 may have a plurality of external teeth 330 meshed with the plurality of internal tooth pins 116. It may also be possible that the gears 310 and 320 are formed based on a common design drawing.

The gears 310 and 320 may perform revolution movement (namely, oscillatory rotation) within the case 111 while being meshed with the internal tooth pins 116. During this time, respective centers of the gears 310 and 320 may revolve about the rotation axis RAX. Relative rotation between the outer cylinder 110 and the carrier 200 may be caused by oscillatory rotation of the gears 310 and 320.

As shown in FIG. 1, each of the three crank shaft assemblies 400 may include a transmission gear 410, a crank shaft 420, a first journal bearing 430, a second journal bearing 440, a first crank bearing 450, and a second crank bearing 460. The first journal bearing 430 may be fitted into a circular hole formed through the base plate portion 211. The second journal bearing 440 may be fitted into a circular hole formed through the end plate 220. The first crank bearing 450 may be fitted into a circular hole formed through the gear 310. The second crank bearing 460 may be fitted into a circular hole formed through the gear 320.

The transmission gear 410 may receive a drive force generated by an appropriate drive source (not shown) such as a motor. It may also be possible that the transmission gear 410 is directly connected to the drive source. Alternatively, it may also be possible that the transmission gear 410 receives a drive force through another mechanism capable of transmitting a drive force (indirect connection). The principle of this embodiment may not be limited to a particular connection structure between the transmission gear 410 and the drive source.

The crank shaft 420 may include a first journal 421, a second journal 422, a first eccentric portion 423, and a second eccentric portion 424. The first journal 421 may be encircled by the base plate portion 211 of the carrier 200. The second journal 422 may be encircled by the end plate 220 of the carrier 200. The first journal 421 may be fitted into the first journal bearing 430. Thus, the first journal 421 may be retained by the base plate portion 211. The second journal 422 may be fitted into the second journal bearing 440. Thus, the second journal 422 may be retained by the end plate 220. That is, the crank shaft assemblies 400 may be retained by the carrier 200.

The first eccentric portion 423 may be fitted into the first crank bearing 450. The gear 310 may be mounted on the first crank bearing 450 (see FIG. 2). The second eccentric portion 424 may be fitted into the second crank bearing 460. Similarly to the gear 310, the gear 320 may be mounted on the second crank bearing 460. The transmission gear 410 may be mounted on the second journal 422.

The first eccentric portion 423 may be positioned between the first journal 421 and the second eccentric portion 424. The second eccentric portion 424 may be positioned between the second journal 422 and the first eccentric portion 423.

FIG. 1 shows a transmission axis TAX. The first journal 421 may extend along the transmission axis TAX. The second journal 422 may extend along the transmission axis TAX on an opposite side to the first journal 421. The first journal 421 and the second journal 422 may rotate about the transmission axis TAX. Each of the first eccentric portion 423 and the second eccentric portion 424 may be formed in a cylindrical columnar shape. Each of the first eccentric portion 423 and the second eccentric portion 424 may be positioned eccentrically from the transmission axis TAX. A revolution phase difference between the gears 310 and 320 may be determined by a difference in eccentricity direction between the first eccentric portion 423 and the second eccentric portion 424.

When the transmission gear 410 rotates, the crank shaft 420 may rotate. As a result, the first eccentric portion 423 and the second eccentric portion 424 may rotate eccentrically. During this time, the gear 310 connected to the first eccentric portion 423 via the first crank bearing 450 can perform revolution movement within the outer cylinder 110 while being meshed with the plurality of internal tooth pins 116. Likewise, the gear 320 connected to the second eccentric portion 424 via the second crank bearing 460 can perform revolution movement within the outer cylinder 110 while being meshed with the plurality of internal tooth pins 116. As a result, each of the gears 310 and 320 can perform oscillatory rotation within the outer cylinder 110.

When the outer cylinder 110 is fixed, during the oscillatory rotation of the gears 310 and 320, the carrier 200 may rotate within the outer cylinder 110. When the carrier 200 is fixed, during the oscillatory rotation of the gears 310 and 320, the outer cylinder 110 may rotate on an outer side of the carrier 200.

The first journal bearing 430 may include an inner race 431, an outer race 432, and a plurality of rolling elements 433 (FIG. 1 shows two rolling elements 433). The inner race 431 may include an inner peripheral surface configured to come in contact with the first journal 421. The outer race 432 may include an outer peripheral surface configured to come in contact with the base plate portion 211. The plurality of rolling elements 433 may be disposed circularly between the inner race 431 and the outer race 432. Each of the plurality of rolling elements 433 may be configured to move by rolling between the inner race 431 and the outer race 432.

The second journal bearing 440 may include an inner race 441, an outer race 442, and a plurality of rolling elements 443 (FIG. 1 shows two rolling elements 443). The inner race 441 may include an inner peripheral surface configured to come in contact with the second journal 422. The outer race 442 may include an outer peripheral surface configured to come in contact with the end plate 220. The plurality of rolling elements 443 may be disposed circularly between the inner race 441 and the outer race 442. Each of the plurality of rolling elements 443 may be configured to move by rolling between the inner race 441 and the outer race 442.

During oscillatory rotation of the gears 310 and 320, the first journal bearing 430 may receive a large load and also be relatively brittle when compared with the other components of the internal member 120. The load action line FLL may pass through an outer side of the outer race 432 and the rolling elements 433 of the first journal bearing 430. That is, the load action line FLL may pass through a space formed between an end surface of the first journal 421 and an end surface of the base plate portion 211 and thus not intersect with the outer race 432 and the rolling members 433. Thus, the first journal bearing 430 may be unlikely to be damaged.

During oscillatory rotation of the gears 310 and 320, the second journal bearing 440 may receive a large load and also be relatively brittle when compared with the other components of the internal member 120. The load action line SLL may pass through an outer side of the outer race 442 and the rolling elements 443 of the second journal bearing 440. That is, the load action line SLL may pass through a space formed between an outer side end surface of the second journal bearing 440 and the transmission gear 410 mounted between the second journal bearing 440 and an end surface of the second journal 422 and thus not intersect with the outer race 442 and the rolling members 443. Thus, the second journal bearing 440 may be unlikely to be damaged.

Design principles described in relation to the above-mentioned various embodiments may be applicable to various gear devices. For example, it may also be possible that the above-mentioned design principles are applied to a center crank-type gear device.

It may also be possible that a part of the various features described in relation to any one of the above-mentioned various embodiments is applied to the gear device described in relation to another of the embodiments. To be specific, it may also be possible that the feature related to the distance IID between the first intersection FIP and the second intersection SIP (Embodiment 1), the feature that the load action lines FLL and SLL pass through the case 111 and the flange portion 112 in a consecutive manner (Embodiment 2), the feature related to a distance of the intersection ISP between the load action lines FLL and SLL from the straight line SAX (Embodiment 2), and the feature that the load action line FLL passes through an outer side of the rolling elements 433 of the first journal bearing 430 and the load action line SLL passes through an outer side of the rolling elements 443 of the second journal bearing 440 (Embodiment 3) are arbitrarily combined and applied to the gear device.

The above-described embodiments may be summarized as follows.

A gear device according to the first embodiment may be provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. A distance between a first intersection where a load action line of the first main bearing intersects with the rotation axis and a second intersection where a load action line of the second main bearing intersects with the rotation axis may be set to fall within a range expressed by an inequality expression below.

$(BBD+BRD\times 2)\times 0.95 < IID < (BBD+BRD\times 2)\times 1.05$ (Expression 1)

IID: Distance Between First Intersection and Second Intersection

BBD: Distance Between First Main Bearing and Second Main Bearing

BRD: Distance Between First Main Bearing and Rotation Axis

According to the above-described configuration, the distance IID between the first intersection and the second intersection may satisfy the following inequality expression, and thus there may be obtained a sufficiently large value of the distance IID between the first intersection and the second intersection. Thus, the gear device can be provided with sufficient robustness with respect to an external force acting to bend the rotation axis.

$(BBD+BRD\times 2)\times 0.95 < IID$ (Expression 2)

The distance IID between the first intersection and the second intersection may satisfy the following inequality expression, and thus in no case may the distance IID between the first intersection and the second intersection have an excessively large value. This may prevent an excessively large load from acting on the outer cylinder.

$IID < (BBD+BRD\times 2)\times 1.05$ (Expression 3)

A gear device according to the second embodiment may be provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. The outer cylinder may include a tubular case and an annular flange portion protruding outward from the case. Each of a load action line of the first main bearing and a load action line of the second main bearing may pass through the case and the flange portion in a consecutive manner.

According to the above-described configuration, each of the load action line of the first main bearing and the load action line of the second main bearing may pass through the case and the flange portion in a consecutive manner, and thus the first main bearing and the second main bearing can be provided with substantially high rigidity.

In the above-described configuration, an intersection between the load action line of the first main bearing and the load action line of the second main bearing may be positioned in the flange portion.

According to the above-described configuration, the intersection between these two load action lines may be positioned in the flange portion, and thus the outer cylinder may be sufficiently thick at a forming position of the flange portion. Thus, the outer cylinder can be provided with sufficiently high rigidity with respect to a force acting in extending directions of the two load action lines.

A gear device according to the second embodiment may be provided with an outer cylinder, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. An intersection where a load action line of the first main bearing intersects with a load action line of the second main bearing may be separated from a straight line by a predetermined distance. The straight line is parallel to the rotation axis, and connects a center of a rolling element of the first main bearing and a center of a rolling element of the second main bearing. The predetermined distance may be set to fall within a range expressed by an inequality expression below.

$$\frac{BBD}{2} \times 0.95 < BID < \frac{BBD}{2} \times 1.05 \quad \text{(Expression 4)}$$

BID: Predetermined Distance

BBD: Distance Between First Main Bearing and Second Main Bearing

According to the above-described configuration, the distance BID between the intersection and the straight line connecting the center of the rolling element of the first main bearing to the center of the rolling element of the second main bearing may satisfy the following inequality expression, and thus there may be obtained a sufficiently large value of the distance BID. A larger value of the distance BID means a larger value of a contact angle, and thus each of the first main bearing and the second main bearing can deliver high performance as a thrust bearing. Thus, the gear device can accept a large force (namely an axial load or a thrust load) acting in the axial direction (namely, a thrust direction).

$$\frac{BBD}{2} \times 0.95 < BID \quad \text{(Expression 5)}$$

The distance BID satisfies the following inequality expression, and thus in no case may the distance BID have an excessively large value. This may prevent an excessively large load from acting on the outer cylinder.

$$BID < \frac{BBD}{2} \times 1.05 \quad \text{(Expression 6)}$$

A gear device according to the third embodiment may be provided with an outer cylinder including an inner peripheral surface having a plurality of internal teeth formed thereon, an internal member at least partially housed in the outer cylinder and configured to rotate relative to the outer cylinder about a predetermined rotation axis, a first main bearing fitted into an annular space formed between the outer cylinder and the internal member, and a second main bearing fitted into the annular space and configured to define the rotation axis in cooperation with the first main bearing. The internal member may include a gear having a plurality of external teeth meshed with the plurality of internal teeth, a crank shaft assembly configured to cause the gear to perform oscillatory rotation so that a center of the gear revolves about the rotation axis, and a carrier retaining the crank shaft assembly and configured to rotate relative to the outer cylinder about the rotation axis. The crank shaft assembly may include a first journal retained by the carrier, a second journal retained by the carrier on an opposite side to the first journal, a first journal bearing configured to receive the first journal inserted thereinto, and a second journal bearing configured to receive the second journal inserted thereinto. Respective load action lines of the first main bearing and the second main bearing may pass through, in an extending direction of the rotation axis, an outer side of a rolling element of the first journal bearing and an outer side of a rolling element of the second journal bearing, respectively.

According to the above-described configuration, the respective load action lines of the first main bearing and the second main bearing may pass through, in the extending direction of the rotation axis, an outer side of the rolling element of the first journal bearing and an outer side of the rolling element of the second journal bearing, respectively, and thus the first journal bearing and the second journal bearing may be prevented from being subjected to an excessively large load.

With regard to the above-described configuration, the respective load action lines of the first main bearing and the second main bearing may pass through, in the extending direction, an outer side of an outer race of the first journal bearing and an outer side of an outer race of the second journal bearing, respectively.

According to the above-described configuration, the respective load action lines of the first main bearing and the second main bearing may pass through, in the extending direction of the rotation axis, an outer side of the outer race of the first journal bearing and an outer side of the outer race of the second journal bearing, respectively, and thus the first journal bearing and the second journal bearing may be prevented from being subjected to an excessively large load.

What is claimed is:

1. A gear device, comprising:
   an outer cylinder including an inner peripheral surface where a plurality of internal teeth are formed;
   an internal member at least partially housed in the outer cylinder and configured to rotate relative to the outer cylinder about a predetermined rotation axis, the internal member including a gear having a plurality of external teeth meshed with the plurality of internal teeth;
   a first main bearing provided between the outer cylinder and the internal member; and
   a second main bearing provided between the outer cylinder and the internal member,
   wherein the outer cylinder includes a tubular case and an annular flange portion protruding radially outwardly from the case,
   wherein the case includes a first portion, a second portion, and a third portion,
   wherein the first portion, the second portion and the third portion are disposed consecutively adjacent to each other along an extending direction of the predetermined rotation axis with the second portion being disposed between the first portion and the third portion;
   wherein the first main bearing is provided radially between the first portion of the case and the internal member;
   wherein the second main bearing is provided radially between the third portion of the case and the internal member;
   wherein the flange portion protrudes radially outwardly from the second portion of the case in a manner such that flange portion does not overlap with the first main bearing or the second main bearing in a radial direction perpendicular to the predetermined rotation axis,
   wherein each of the first main bearing and the second main bearing includes a plurality of rolling elements each of which includes a first end surface, a second end surface and an outer peripheral surface connecting the first end surface and the second end surface, and wherein each of a load action line of the first main bearing and a load action line of the second main bearing passes through the second portion of the case and the flange portion in a consecutive manner without passing through the first portion or the third portion of the case.

2. The gear device of claim 1, wherein each of the plurality of rolling elements has a shape of a substantially circular truncated cone.

3. The gear device of claim 1, wherein the second end surface of each of the plurality of rolling elements is configured as substantially coaxial with the corresponding first end surface.

4. The gear device of claim 1, wherein the second end surface of each of the plurality of rolling elements is configured to be closer to the rotation axis than the corresponding first end surface is.

5. The gear device of claim 1, wherein the first end surface of each of the plurality of rolling elements is configured to be wider than the corresponding second end surface.

6. The gear device of claim 1, wherein each of the first main bearing and the second main bearing includes an inner race and an outer race, wherein the outer peripheral surface of each of the plurality of rolling elements is configured to come in contact with the corresponding inner race and the corresponding outer race.

* * * * *